July 21, 1942.     O. R. ROWE     2,290,384
HOISTING APPARATUS
Filed Dec. 11, 1941     3 Sheets-Sheet 3
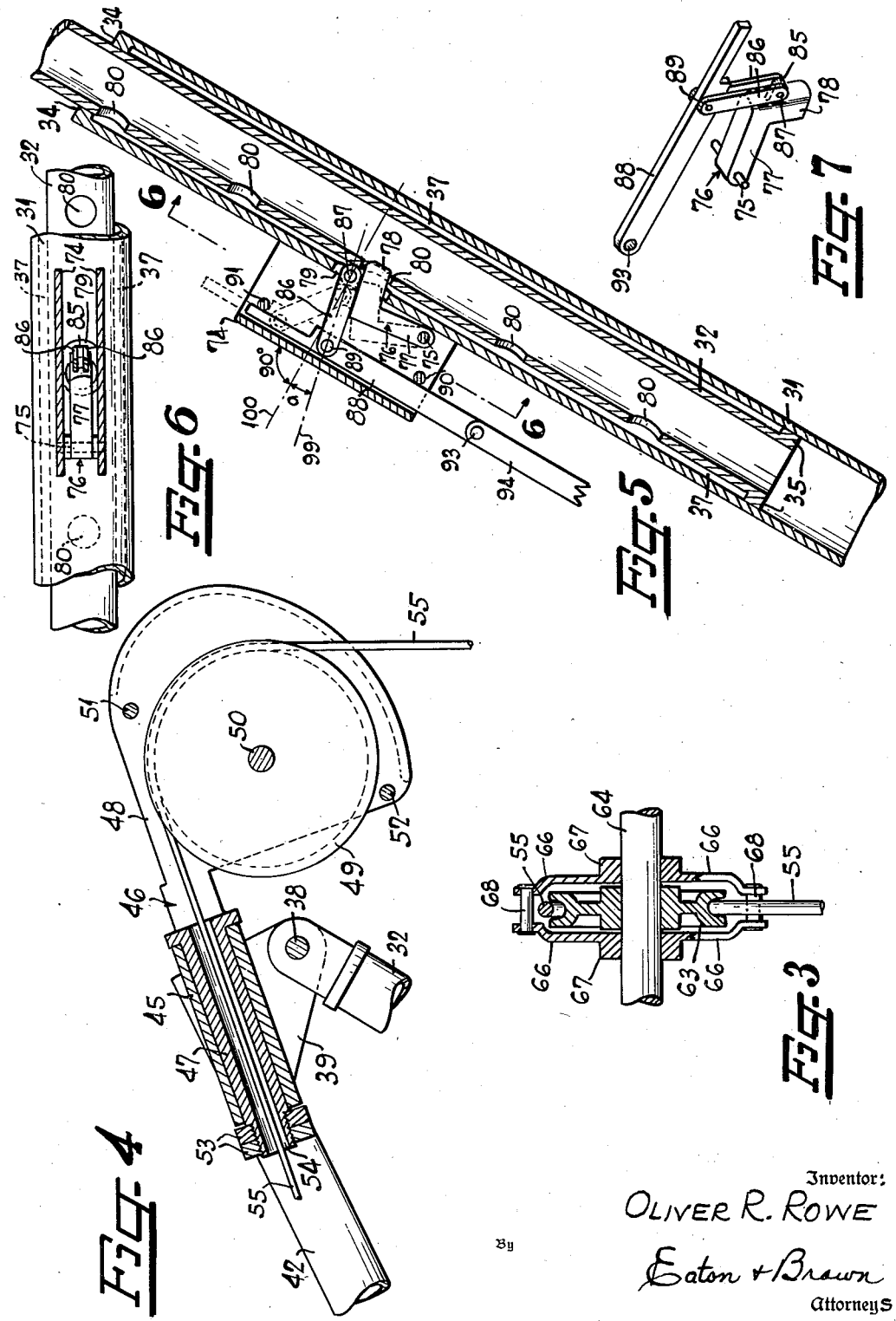
Inventor:
OLIVER R. ROWE
By Eaton & Brown
Attorneys Patented July 21, 1942

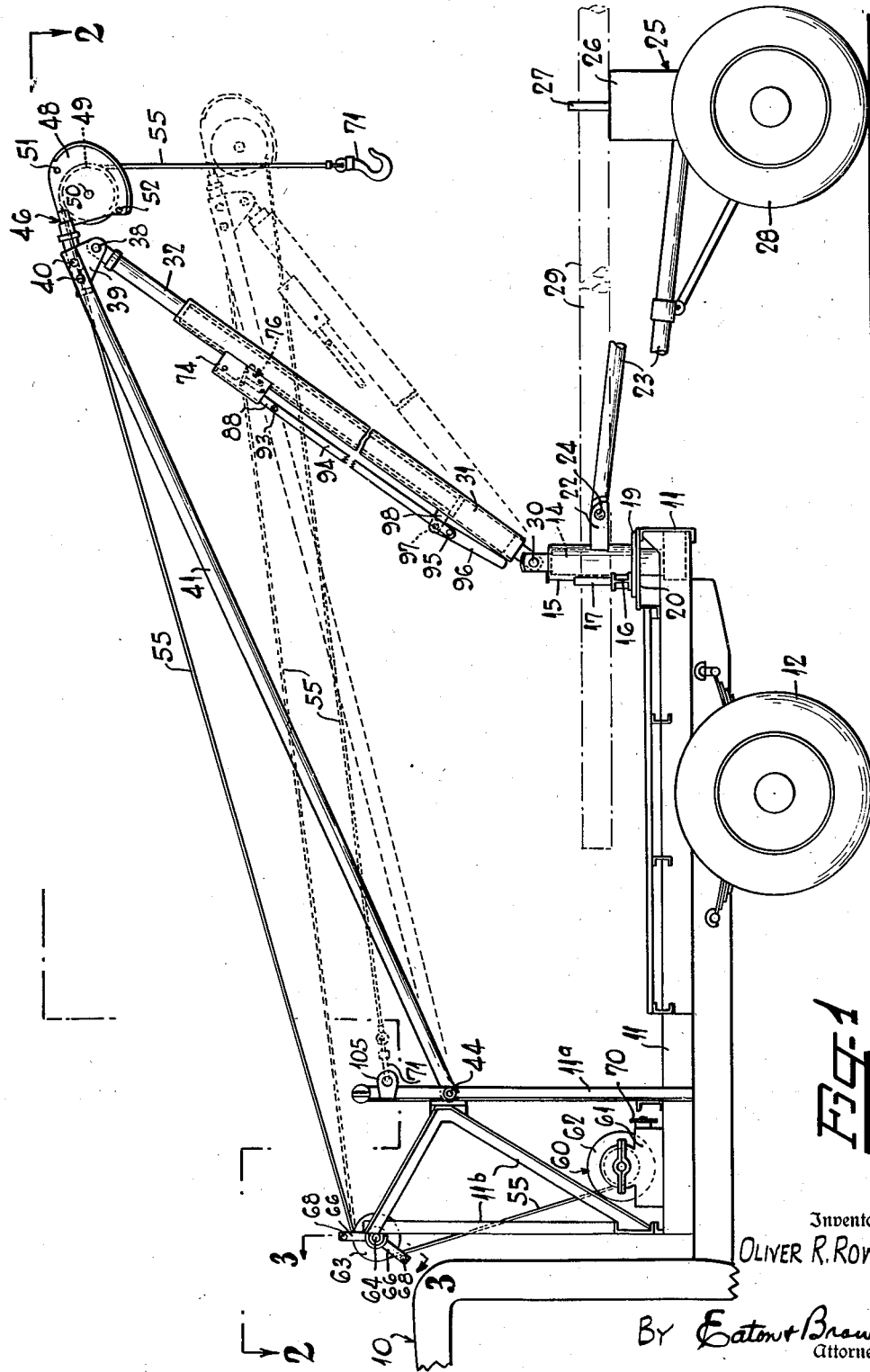

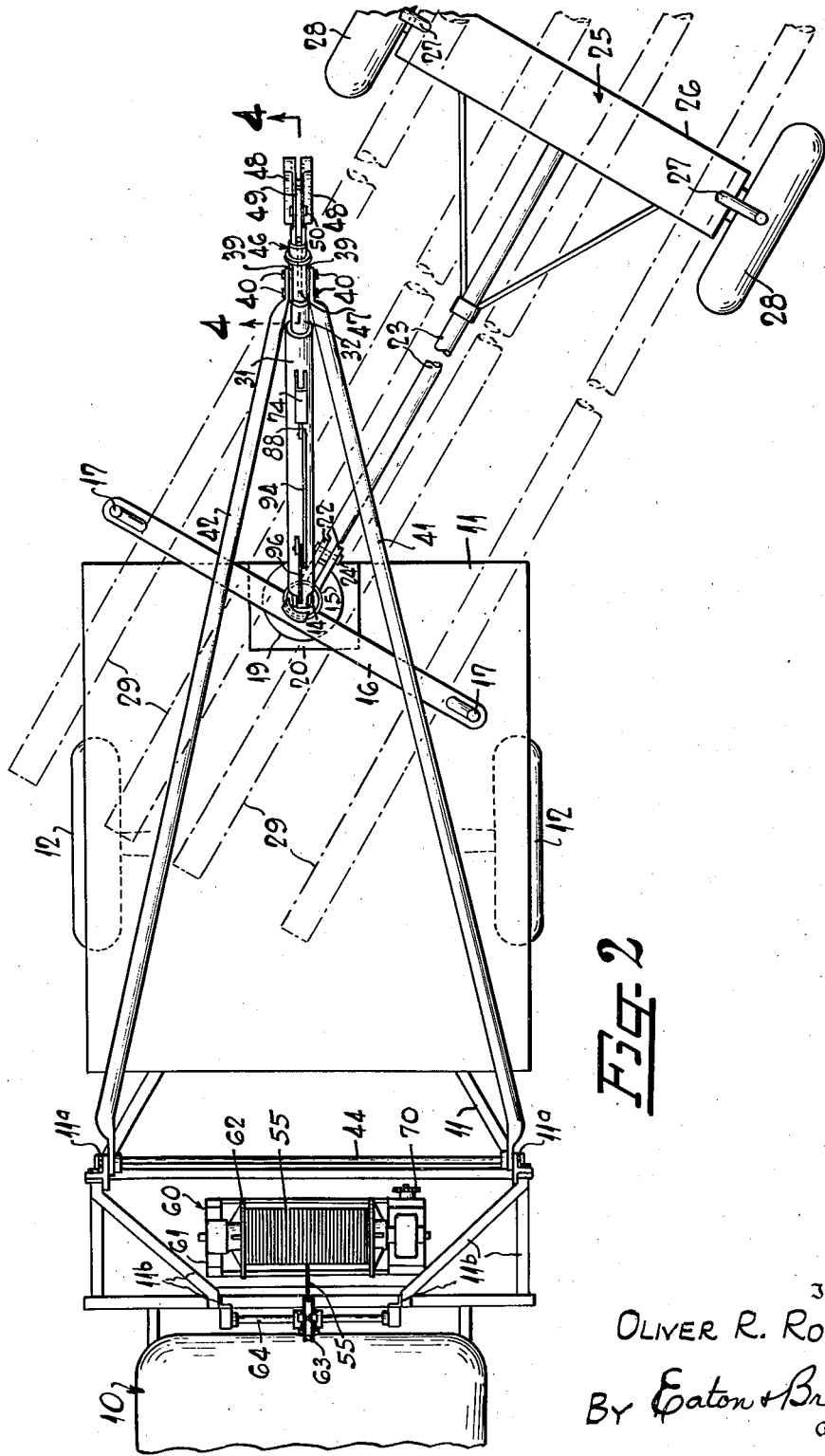

2,290,384

UNITED STATES PATENT OFFICE 2,290,384

HOISTING APPARATUS

Oliver R. Rowe, Charlotte, N. C., assignor of one-half to Ralph H. Bouligny, Charlotte, N. C.

Application December 11, 1941, Serial No. 422,550

11 Claims. (Cl. 214—65)

This invention relates to a hoisting apparatus and more especially to an adjustable derrick structure for wheeled vehicles. The present invention is particularly adapted for loading, unloading and setting poles such as telephone poles.

Since telephone poles and the like are usually erected at spaced intervals along a line, it is desirable to provide a truck and trailer unit which is capable of carrying a number of poles and loading and unloading these poles, and setting them all without dismantling the derrick. Heretofore, much difficulty has been encountered because the hoisting apparatus could not be effectively combined with the pole carrying apparatus in a single unit which could be moved safely over all normal streets and highways without dismantling parts of the boom. In many instances the boom or derrick of the hoisting structure was pivoted to the rear portion of the truck chassis, thereby creating an objectionable overhang from the rear of the truck when the boom was lowered for transportation. Furthermore, the pivoting of the boom in the rear of the chassis often made it impractical to attach a trailer unit for carrying poles without first dismantling the boom and thus destroying its value as a loading apparatus. Furthermore, when it was necessary to use the derrick structure for setting a pole after it had been dismantled for transportation or for attaching a trailer unit, it was necessary to reassemble the boom.

It is therefore an object of this invention to provide a combination truck and trailer unit for jointly carrying poles from one point to another along telephone lines and the like, together with an adjustable pole derrick carried by the truck in such a manner that its structure will not interfere with the poles on the truck and trailer while in transit. Specifically this feature of the invention comprises, in part, a novel bolster arrangement pivotally mounted near the rear of the truck. Secured to the bolster is the trailer unit. One end of each pole will rest upon the bolster and the other end will rest upon the trailer. In order to prevent the poles from interfering with the derrick structure, the bolster pivot is used to support one leg of the derrick, whereas the other legs of the derrick are secured to the truck chassis at points nearer to the front end thereof. Such an arrangement makes it possible to extend the front ends of the poles forwardly beyond the truck bolster and beneath the derrick or boom structure. When the bolster turns about its pivot (which pivot is also a support for one leg of the derrick), the front ends of the poles will not engage the derrick.

It is an object of this invention to provide a derrick structure for wheeled trucks in which a leg or legs of fixed length are pivoted to the intermediate or forward portion of the truck and another leg of adjustable length is pivoted to the rear portion of the truck, the fixed and adjustable legs being pivoted together near their upper ends. This arrangement of the pivots insures that the legs of fixed length will at all times overlap at least a portion of the truck chassis and thereby prevent objectionable overhang when the derrick is lowered for transportation.

A further object of this invention is to provide a derrick structure of the class described in which there is a cable supporting caster on the boom which will swivel in the direction of the loaded end of the cable to provide less obstruction to the cable as it is drawn in.

It is a further object of this invention to provide a derrick structure of the class described in which a novel latching arrangement is employed for the adjustable leg. Means are employed whereby two elements of the adjustable leg may be latched together so that they are securely fixed with relation to each other while the leg is in either tension or compression. By means of a remote control hand lever, the latch may be released so that the adjustable leg may be lengthened or shortened or the hand lever may be held in such a position that the adjustable leg may be lengthened only.

Some of the objects of the invention having been stated, other objects will appear as the description proceeds, when taken in connection with the accompanying drawings, in which—

Figure 1 is a side elevation of a portion of a truck and trailer illustrating my invention;

Figure 2 is a plan view with parts in section and parts omitted and being taken along the line 2—2 in Figure 1;

Figure 3 is a vertical sectional detail view taken along the line 3—3 in Figure 1;

Figure 4 is an enlarged vertical sectional view taken along the line 4—4 in Figure 2;

Figure 5 is a sectional detail view illustrating the novel latching arrangement for the adjustable leg of the derrick structure.

Figure 6 is a sectional plan view taken along the line 6—6 in Figure 5;

Figure 7 is an isometric detail view illustrating portions of the latch assembly.

Referring more particularly to the drawings, the numeral 10 denotes a portion of a truck having a chassis 11 and supporting wheels 12. Extending upwardly from the rear end of the chassis 11 is a suitable post 14, around which is rotatably mounted a sleeve or collar 15. This sleeve has secured to the intermediate portion thereof, a transversely disposed bolster 16 having upstanding standards or pins 17 in each end thereof. The bottom portion of the bolster is adapted to rest upon a suitable lateral flange 19 which is integral with the bottom of sleeve 15. Flange 19 also serves as a base which, in turn, rests upon base plate 20 disposed on the rear portion of the chassis.

Trailer structure

The intermediate portion of the sleeve 15 has extending rearwardly therefrom, a pair of spaced arms 22. One end of a suitable tongue or pipe 23 is adapted to fit between the ends of arms 22 and to be secured in this position by means of a suitable removable pin 24. The tongue 23 extends rearwardly from the back end of the truck and has attached to its trailing end a suitable trailer unit 25, said unit comprising a fixed bolster 26 having standards 27 extending upwardly from near each end thereof. Also suitable wheels 28 are employed for supporting the bolster 26. The bolster 16 and 26 jointly serve to carry a suitable load 29 such as telephone poles and the like. In other words, the front ends of the poles are adapted to rest upon bolster 26. Of course, the standards 17 and 27 serve to hold the poles upon the bolsters. Since the trailer unit 25 is secured to the pivoted bolster 16, the bolster 16 will remain substantially parallel to the bolster 26 at all times, regardless of any horizontal angle through which the truck may turn. For example, when the truck is making a left hand turn, as shown in Figure 2, the ends of the poles 28 which project forwardly beyond the bolster 16 will rotate about the post 14 as an axis and above the intermediate portion of the truck chassis.

Pole derrick structure

As heretofore stated, great difficulty has been experienced in obtaining a combination hoisting and transportation assembly which could be used for hoisting and carrying respectively, without detaching either unit from the assembly. It is very desirable that a derrick structure on a truck be supported both at the rear end of the truck and at the intermediate portion thereof in order to cut down to a minimum the amount of material necessary to construct the same. It is also desirable to have the derrick structure overlap as much of the rear portion of the chassis as possible so that when the derrick is lowered for transportation purposes, the overhanging portion of the derrick beyond the truck will be as short as possible. By having the derrick structure more centrally anchored to the chassis of the truck, the likelihood of overturning the truck when lifting loads is reduced. With these remarks in mind, I have pivotally secured to the upper end of the post 14, as at 30, a suitable pipe member 31, said pipe member extending upwardly and having telescopically mounted therein, a second pipe member 32. The upper end of the pipe member 31 (Figure 5) has an inturned lip of flange 34, which closely fits the outer periphery of the inner pipe 32. Also the inner pipe has an outstanding flange 35 integral with its lower periphery which slidably fits on the interior of the outer pipe 31, thereby leaving an annular space 37 between the outer periphery of the inner pipe and the inner periphery of the outer pipe, in which a suitable lubricant may be placed.

The upper end of the inner pipe 32 is pivoted as at 38 between suitable plates 39 which plates are also secured as at 40 between the upper ends of pipe members 41 and 42, said members 41 and 42 diverging outwardly and downwardly from the points 40 and having their lower ends pivotally mounted around suitable transversely disposed shafts or spindles 44. Members 31, 32, 41 and 42 essentially comprise the derrick or boom structure in the present invention.

Swivel sheave structure

The plate members 39 have a suitable bearing 45 secured thereto (Figure 4). This bearing is adapted to have rotatably mounted therein a bracket 46, said bracket comprising a round, hollow spindle portion 47 which has integral with its upper end a pair of spaced plate members 48. Between the plate members 48 a suitable sheave 49 is rotatably mounted as at 50. In order to properly space the plate members 48 apart from each other and to keep the cable on the sheave, suitable bolts 51 and 52 are employed. The bracket 46 is held in position within the bearings 45 by means of a suitable collar 53 on the lower end of spindle portion 47.

It is seen that the spindle portion 47 has an enlarged bore 54 through which the cable 55 passes to and from the sheave 49. Of course the direction of pull upon the hook end of the cable as it passes downwardly from the sheave 49 will largely determine the position assumed by the bracket 46, as it rotates in spindle bearing 45.

The transverse rod 44 to which the lower ends of members 41 and 42 are pivotally secured is supported by two upstanding posts of the chassis superstructure 11a at an elevation substantially above the top of bolster 16. Likewise, the telescopic leg comprising members 31 and 32 is pivoted as at 30 a substantial distance above the same bolster. This leaves a substantial amount of room between the pivot points 30 and 44 to be occupied by the load carried jointly by the truck and the trailer unit.

Lifting mechanism

The truck 10 is provided with a conventional winch broadly designated by the reference character 60. This winch comprises a framework 61 in which is rotatably mounted a suitable drum 62, said drum having wound thereon a portion of cable 55 previously described. From the drum 62 the cable extends upwardly and around a suitable sheave or pulley 63 located above the pivot point 44 of the legs 41 and 42. This pulley 63 is rotatably mounted around a shaft 64 which in turn is supported by the upper portion of chassis superstructure 11a. By referring to Figure 3, it is seen that the pulley 63 may also travel axially of the shaft 64, if there happens to be a lateral stress imparted thereto by the movement of cable 55. The drum 62 has considerable length and therefore, as the cable is wound thereon, it will have a traversing motion. This motion will exert lateral pressure upon the pulley 63 and thereby move it axially of the shaft 64. In order to confine the cable 55 upon the pulley 63 during this traversing motion, suitable arms 66 are provided which extend radially from suitable hubs 67 on opposed sides of the pulley 63. The free ends of the arms 66 have pins 68 joining the same which serve to prevent the cable 55 from rolling out of the grooved pulley 63. Since the hubs 67 are loosely mounted on the shaft 64 the lateral pressure exerted upon the pulley will also exert a similar lateral pressure upon the hub members and cause them to move axially of the shaft along with the pulley. The drum 62 of the winch 60 is wound or unwound by a conventional mechanism which is usually connected to the motor of the truck. In the present instance, a suitable sprocket 70 is employed for imparting motion to the drum 62.

The end of the cable 55 has a suitable hook 71 secured on the end thereof which is employed for fastening the end of the cable around poles and the like when it is desired to load or unload the same or when it is desired to lift a pole to an erected position.

*Latching mechanism for the adjustable leg of the derrick*

The conditions under which the derrick structure operates and the type of job to be performed largely determines the elevation of the upper end thereof. For example, where it is desired to erect a very high pole, it is often necessary to have the pulley 49 occupy a high position, in fact a position much higher than the position shown in Figure 1. On the other hand, when transferring the derrick structure from one location to the other, it is desirable to lower the same as much as possible. Therefore, it is necessary to provide means for locking the two members 31 and 32 in various elongated positions and to thereby have a leg of variable length.

This latching means is supported by an inverted U-shaped plate member 74 which is secured to the upper portion of the outer pipe 31 by any suitable means such as welding or the like. Pivotally secured between the sidewalls of this U-shaped member as at 75 is an L-shaped latch member 76, said latch member having leg portions 77 and 78 extending substantially at right angles to each other. The end of portion 78 is adapted to penetrate at all times a suitable opening 79 in the outer pipe 31, and when the two pipes 31 and 32 are latched together this portion 78 penetrates an additional hole 80 disposed in the inner pipe 32. It is seen by referring to Figure 5 that there are a plurality of spaced holes 80 each of which is adapted to receive the projecting portion 78 when the inner pipe 32 has been lengthened or shortened until that particular hole coincides substantially with the hole 79 in the outer pipe.

The portion 78 has integral therewith a lug 85 (Figure 6) to which is pivotally secured a pair of strap members 86 as at 87. These strap members extend upwardly and are also pivotally secured to opposed sides of a sliding bar 88 as at 89, said bar 88 being supported within the U-shaped member 74 by means of transverse bolts 90 and 91. Bar 88 has pivoted to its lower end as at 93 a link 94 which in turn is pivotally secured as at 95 to a hand lever 96. This hand lever is pivoted as at 97 to a lug 98 extending upwardly from the outer pipe 31 (Figure 1).

When it is desired to release the projecting portion 78 of the latch from a hole 80 in the inner pipe 32, it is necessary to first rotate the handle 96 in a clockwise manner in Figure 1, thereby moving members 94 and 88 upwardly (Figure 5) to dotted line position. This movement, in turn, will increase the straight line distance between pivot points 75 and 89 and thereby pull the projecting portion 78 out of the hole 80. At this time, the overall length of the two pipes 31 and 32 may be shortened or lengthened as desired. It should be borne in mind, however, that when the handle 96 is in the "down" position as shown in Figure 1, the links 86 will have crossed dead center, that is, will be disposed below dot-dash line 100 and in the bold line position shown in Figure 5. This securely locks leg 78 so that no force between telescoping members 31 and 32 can force it out of holes 80. In fact the latch may be released only by sliding the bar 88 upwardly and thus crossing dead center line 100 to occupy the dotted line position as shown in Figure 5. This is a safety precaution in case a pole or the like should fall back against the hoist legs and tend to extend the telescoping leg.

When handle 96 is in the "up" position, the leg 78 is pulled out of a hole 80 and the telescoping leg 32 may be slid in or out of leg 31 to the desired length. This movement is accomplished by attaching hook 71 to eyelet 105 and then pulling or releasing the cable on the winch after the latch is released and until the telescoping legs are slightly longer than the desired length. Handle 96 is then forced with slight pressure towards the down position and the winch is slowly released. Leg 78 slides on telescoping member 32 until it falls into the hole 80 immediately therebelow, and the downward pressure which is being applied upon the handle will cause it to assume the locked position as shown in Figure 1. The eyelet 105 should be located above the pivot point 44. Thus when hook 71 is attached to the eyelet and the winch 60 winds up the cable the resultant forces tend to lift the head of the hoist about the pivot point 44. Thus the locking is done while the cable is being released and if the operator is slow about stopping the winch, no harm is done. The pivot point 75 of latch 76 is so located that a force caused by tension on members 31 and 32 will create a couple that will rotate the latch to the released position in case this tension is applied before links 86 reach a locking position. This is another safety precaution in case the latch operator fails to fully release the latch.

In the drawings and specification, there has been set forth a preferred embodiment of the invention, and although specific terms are employed, they are used in a generic and descriptive sense only and not for purposes of limitation, the scope of the invention being set forth in the appended claims.

I claim:

1. The combination with a wheeled truck having a chassis, of a rearwardly extending member pivoted to the intermediate portion of said chassis, a post extending upwardly from the rear portion of said chassis at a point rearwardly of the first-named pivot, a second member having its lower end pivotally secured to said post, the free ends of said first and second members being pivotally secured together, a trailer having the front end thereof pivotally secured to said post, a winding mechanism having a cable extending therefrom, means carried by the free ends of said members for supporting said cable, and means for varying the length of said second member to thereby raise and lower the free ends of said members.

2. The combination with a wheeled truck having a chassis, of a post extending upwardly from the rear end of said chassis, a transversely disposed bolster rotatably mounted upon said post, a trailer having the front end thereof secured to said bolster, and a derrick including a pair of connected upwardly extending members, one of said members being supported by said post and the other of said members being supported by the intermediate portion of said chassis forwardly of the post, whereby a load jointly carried by the trailer and bolster may turn about said post without interfering with said derrick.

3. The combination with a wheel truck having a chassis, of a transversely disposed bolster pivotally secured to the rear portion of said chassis, a wheeled trailer secured to said bolster and a derrick supported by said pivot and an intermediate portion of the chassis whereby a load jointly carried by the trailer and bolster may turn about said pivot without interfering with said derrick.

4. A pole derrick for truck chassis and the like comprising an upwardly extending post secured to the rear portion of said chassis, an upwardly extending leg pivotally secured to said post, a pair of diverging legs pivotally secured to the upper portion of the first leg, said diverging legs having the forward ends thereof pivotally secured to said chassis at points forwardly of the first leg pivot whereby the diverging legs will be normally disposed in overlapping position with the rear portion of the chassis, and a trailer having the front end thereof pivotally secured to said post.

5. A pole derrick for truck chassis and the like comprising an upwardly extending leg pivotally secured to the rear portion of said chassis, a second leg telescopically attached to said first leg, and a third leg having one end thereof pivotally secured to said second leg and its other end pivotally secured to said chassis at a point forwardly of the first-named pivot, whereby the third leg will remain in overlapping position with the rear portion of the chassis when said first and second legs are shortened, said first leg having a plurality of spaced holes therein, and a pivoted latch carried by said second leg and adapted to selectively penetrate said holes.

6. A pole derrick for truck chassis and the like comprising an extensible leg pivotally secured to the truck chassis, a second leg pivotally secured to the first leg and also pivotally secured to said chassis at a point forwardly of the first-named pivot whereby the second leg will remain in overlapping position with the chassis when the extensible leg is shortened, a latch for releasably locking said extensible leg in any one of a plurality of positions, and means for rendering said latch ineffective when said extensible leg is subjected to tensile stress and automatically effective when subjected to compressive stress.

7. A pole derrick for truck chassis and the like comprising an upwardly extending leg pivotally secured to the rear portion of said chassis, a second leg telescopically attached to said first leg, a third leg having one end thereof pivotally secured to said second leg and its other end pivotally secured to said chassis at a point forwardly of the first-named pivot whereby the third leg will remain in overlapping position with the rear portion of the chassis when said first and second legs are shortened, said first leg having a plurality of spaced holes therein, a pivoted latch carried by said second leg and adapted to selectively penetrate any one of said holes, and means for rendering said latch ineffective when said first and second legs are subjected to tensile stress and automatically effective when subjected to compressive stress.

8. The combination with a wheel truck having a chassis, of a rearwardly extending member pivoted to the intermediate portion of said chassis, a second member pivoted to said chassis at a point rearwardly of the first-named pivot, the free ends of said first and second members being pivotally secured together, a winding mechanism having a cable extending therefrom, a rotatably mounted sheave support carried by the free ends of said members, and a sheave rotatably mounted in said support, said support having a bore therein extending substantially along its axis of rotation for enclosing said cable as it passes between said winding mechanism and said sheave, whereby the sheave may be bodily rotated through an angle of 360° about the support and enclosed cable as an axis.

9. A pole derrick for truck chassis and the like comprising an upwardly extending leg pivotally secured to the rear portion of said chassis, a second leg telescopically attached to said first leg, a third leg having one end thereof pivotally secured to said second leg and its other end pivotally secured to said chassis at a point forwardly of the first-named pivot, whereby the third leg will remain in overlapping position with the rear portion of the chassis when said first and second legs are shortened, a latch for locking said first and second legs in fixed relation to each other, and means for rendering said latch ineffective when the first and second legs are subjected to tensile stress and automatically effective when subjected to compressive stress.

10. The combination with a wheeled truck having a chassis, of a rearwardly extending member pivoted to the intermediate portion of said chassis, a second member pivoted to said chassis at a point rearwardly of the first-named pivot, the free ends of said first and second members being pivotally secured together, a winding mechanism having a cable extending therefrom, a transversely disposed shaft mounted on said chassis, shaft shaft being located at a point above the pivot point for the first rearwardly extending member, an axially movable pulley rotatably mounted on said shaft, said pulley being adapted to support said cable as it passes from the winding mechanism and means carried by the free ends of said first and second members for supporting said cable as it passes from said pulley.

11. A pole derrick for truck chassis and the like comprising an upwardly extending leg pivotally secured to the rear portion of said chassis, a pair of diverging legs pivotally secured to the upper portion of the first leg said diverging legs having the ends thereof pivotally secured to said chassis at points forwardly of the first leg pivot, a winding mechanism having a cable extending therefrom, a transversely disposed shaft mounted at a point above the pivots of said diverging legs on the truck chassis, an axially movable pulley rotatably mounted on said shaft, said pulley being adapted to receive said cable as it passes from said winding mechanism, means carried by the upper portions of said legs for supporting said cable as it passes from said pulley, said first leg comprising a pair of telescopically mounted members, means for varying the overall length of said telescopically mounted members to thereby vary the length of said first-named leg and to raise and lower the height of the cable supporting means carried by the upper ends of all of said legs, and means for rendering said length varying means ineffective when the first leg is subjected to tensile stress and automatically effective when subjected to compressive stress.

OLIVER R. ROWE.